Oct. 29, 1935.  L. H. GUDE  2,018,716
BATTERY CHARGING VOLTAGE REGULATOR
Filed July 20, 1934  3 Sheets-Sheet 1

INVENTOR.
LOUIS H. GUDE.
BY HIS ATTORNEYS.
Williamson & Williamson

Oct. 29, 1935.  L. H. GUDE  2,018,716

BATTERY CHARGING VOLTAGE REGULATOR

Filed July 20, 1934   3 Sheets-Sheet 2

INVENTOR.
LOUIS H. GUDE.
BY HIS ATTORNEYS.
Williamson & Williamson

Oct. 29, 1935. L. H. GUDE 2,018,716
BATTERY CHARGING VOLTAGE REGULATOR
Filed July 20, 1934 3 Sheets-Sheet 3

INVENTOR
LOUIS H. GUDE.
BY HIS ATTORNEYS.
Williamson & Williamson

Patented Oct. 29, 1935

2,018,716

UNITED STATES PATENT OFFICE 2,018,716

BATTERY CHARGING VOLTAGE REGULATOR

Louis H. Gude, Eau Claire, Wis.

Application July 20, 1934, Serial No. 736,178

7 Claims. (Cl. 171—314)

My invention relates to automatic voltage regulating electrical apparatus and particularly to apparatus for regulating the voltage applied to a storage battery in charging the same.

Lead storage batteries are used in stations and substations of electric central station power systems as sources of electrical energy for operating power control equipment, emergency lighting equipment, and other apparatus. Such batteries are called upon to carry occasional heavy loads of short duration, moderate continuous loads or a combination of the two types of loads. It is preferable that such batteries be maintained in fully charged condition at all times insofar as possible and it has been found that this result may be attained best by continuously charging the battery by the "floating charge" method at a suitable constant voltage. It has also been found that the useful life of a battery is longest when the battery is charged in this manner.

The charging voltage applied to a battery is very critical in its effect on the charging current in that a relatively slight change in charging voltage will cause a very substantial change in charging current. When the charging voltage is too high the positive plates and separators of the battery will be damaged and when the charging voltage is too low the negative plates will become sulphated and the cells of the battery will become unevenly charged. While, as indicated above, it is very important to maintain the proper charging voltage within very close limits, such results cannot be attained by the present methods of charging. Variation in voltage on supply circuits feeding battery charging rectifiers or motor-generator sets result in variation in the charging voltage applied to batteries being charged by such apparatus. Occasional checking and manual adjustment of charging voltage by an attendant has been found unsatisfactory and the infrequent adjustments possible in unattended installations are obviously very inadequate.

Since the terminal voltage of a battery being charged changes very slowly to a new steady value following a readjustment of the charging apparatus an automatic charging voltage regulator of a type tending to quickly re-establish the desired voltage immediately following variation therefrom will tend to over-regulate and to adjust alternately upwardly and downwardly in rapidly recurring cycles. Such rapid operation would cause undue wear and tear in the device.

It is an object of my invention to provide an automatic voltage regulating device which is responsive to the terminal voltage of a storage battery which is being charged by battery charging apparatus and which acts to so control the charging apparatus that the terminal voltage of the battery will be maintained at a certain predetermined value regardless of changes in the load carried by the battery and in the voltage of the supply circuit feeding the charging apparatus.

Another object is to provide such a regulator which, at predetermined intervals, will measure the battery terminal voltage and, if the battery terminal voltage differs from the voltage desired, will operate to re-adjust the charging apparatus to a limited extent to effect a subsequent change in battery terminal voltage toward the desired voltage.

Still another object is to provide such a regulator which is free of lag and inaccuracies such as would result from frictional drag or the like and wherein the movable voltage-responsive element need not carry electrical contacts or any other actuating elements.

A further object is to provide such a regulator of simple, reliable and durable construction and capable of effecting extremely accurate regulation.

These and other objects and advantages of the invention will be more fully set forth in the following description made in connection with the accompanying drawings, in which like reference characters refer to similar parts throughout the several views, and in which:—

Figure 1:
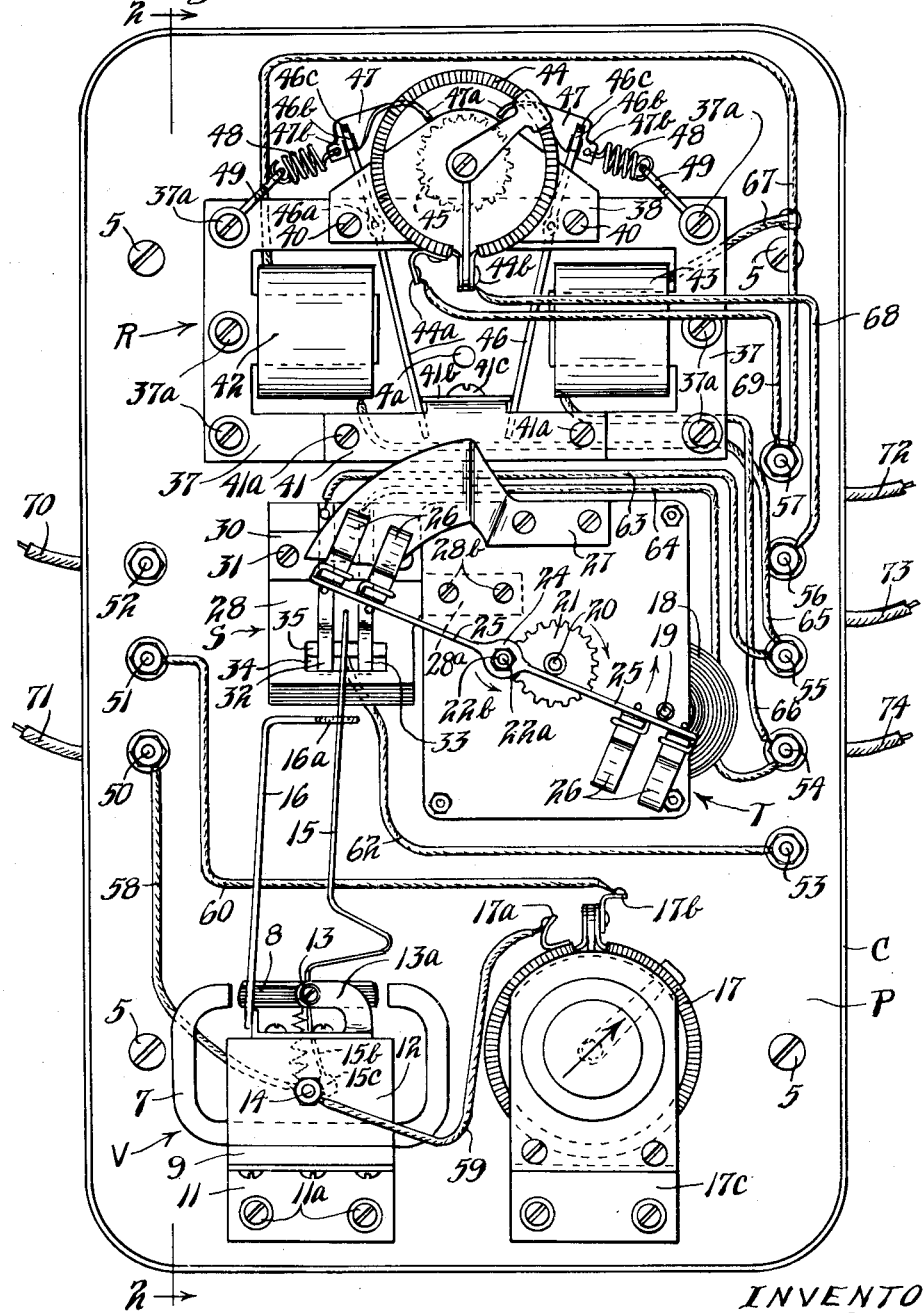
Fig. 1 is a front view of my battery charging voltage regulator.

Referring to the drawings, a panel P, upon which the parts of my battery charging voltage regulator are mounted, is located in an open fronted casing C in spaced parallel relation to the back thereof. The panel P is secured in place by means of screws 5 which extend through the panel into lugs 6 extending inwardly of and formed integrally with the sides of the casing.

Preferably, the panel P is formed of insulating material.

To protect the parts of my regulator from damage and entrance of dust, a cover 4 offset outwardly along its rearward edge to fit the forward edge of the casing C is provided. A stud 4a is secured at its screw-threaded rear end to the panel P by means of nuts 4b disposed at opposite sides of the panel has a screw threaded forward end extending through a suitable aperture in the cover 4. Nuts 4c, mounted on the forward end of the stud 4 at opposite sides of the cover 4 clamp a portion of the cover therebetween and thus secure the cover in place as shown. Removal of the cover 4 is obviously readily permitted by removing the outer one of the nuts 4c.

A voltage responsive element V, similar to the movement of a moving coil type of direct current voltmeter, is mounted on the lower left portion of the panel P. This voltage responsive element includes a generally C-shaped permanent magnet 7 and a flat coil 8 disposed between the poles of the magnet. The magnet 7 is secured to a base 9 by means of a clip 10 which is secured to the base 9 by means of screws 10a. The base 9 is attached to a bracket 11 which extends outwardly of the panel P and is secured thereto by means of nutted bolts 11a.

A pair of blocks 12 formed of insulating material extend upwardly from and are rigidly attached to the base 9. A bracket 13a mounted on top of each of the blocks 12 carries a bearing 13. Pivots 8a rigidly secured to and extending outwardly from opposite sides of the coil 8 are journaled in the respective bearings 13 for free rotation with respect thereto. A pair of electrical terminal posts 14 are respectively mounted in apertures in the blocks 12 and a coiled wire 8b is connected between each of the posts 14 and one of the respective ends of the winding of the coil 8. A vane 15, comprising a member formed of stiff wire, extends upwardly from the movable coil 8 so as to be shifted or swung by the coil 8 as the same moves. The upper end of the vane 15 is turned inwardly toward the panel P at right angles to form a tripping element 15a. Means is provided to limit the swinging of the vane 15 and comprises a stiff wire 16 rigidly secured at its lower end to one of the brackets 13a and formed at its upper end into a rearwardly opening horizontally disposed U-shaped stop member 16a so located that the upper portion of the vane 15 is disposed between the respective side portions of the U.

A portion 15b of the wire forming the vane 15 extends below the moving coil 8 and is inclined to the right. A small weight 15c is mounted on the lower end of the member 15b.

The voltage responsive element V described above is in general similar to a D'Arsonval voltmeter or galvanometer movement except that the vane 15 is substituted for a pointer, the stop member 16a is provided and the weight 15c is substituted for hair-springs.

To the right of the voltage responsive element a rheostat or variable resistance 17 having terminals 17a and 17b is supported from the panel P by means of a bracket 17c.

A clock or timing device T having a spring 18, a spring winding shaft 19 and a slowly revolving shaft 20 driven by the spring 18 is mounted on the panel P above the rheostat 17. A gear 21 is mounted on the shaft 20. A post 22 mounted on the front of the clock T carries a stud or pin 22a on its outer or forward end and a small gear 23 is revolubly mounted on the pin 22a and meshed with the gear 21. A nut 22b is screw threadedly mounted on the outermost portion of the pin 22a to retain the small gear 23 in place on the pin 22a. A hub 24 revolubly mounted on the pin 22a forwardly of the gear 23 is attached to the gear 23 to rotate therewith. Radially disposed arms 25, preferably formed of stiff wire, extend outwardly from diametrically opposite sides of the hub 24 to such a distance that the outermost end of each arm 25 will sweep past the free end of the tripping element 15a of the vane 15 of the voltage responsive element V when the hub 24 is rotated. The clock T is so arranged that it will slowly rotate the arms 25 in a counter-clockwise direction as viewed in Fig. 1.

A pair of actuating elements or tumblers 26 are swingably mounted on the outer end of each of the arms 25 in coaxial relation to each other. The axes of the respective tumblers 26 are parallel to the arms 25 and the tumblers 26 of each pair are slightly spaced apart longitudinally of the arm upon which they are mounted.

Figure 2:
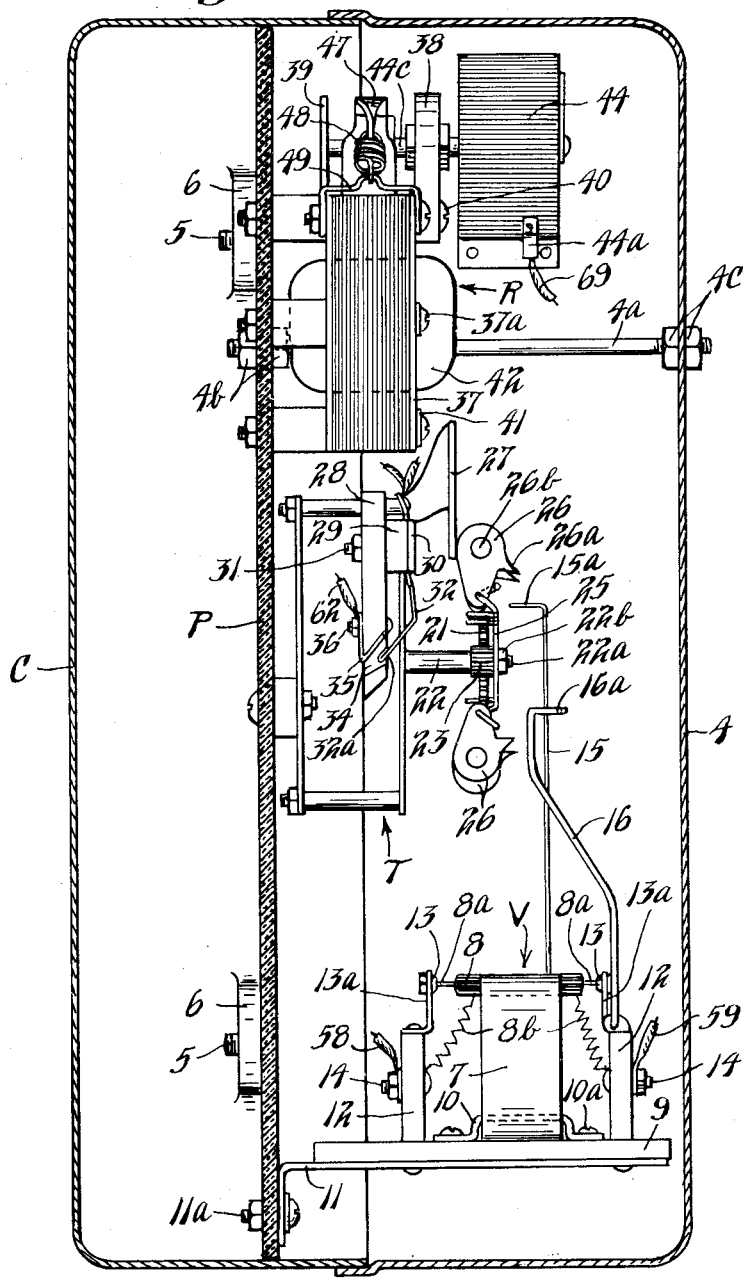
Fig. 2 is a section taken along the line 2—2 of Fig. 1 as indicated by the arrows.

Each tumbler 26 is formed of flat relatively thick material such as bakelite panel stock or similar material cut out in an egg like shape as best illustrated in Fig. 2. A lip element 26a is formed on one side of the larger end of the tumbler 26 and a plug 26b, formed of heavy material such as lead is secured in a suitable aperture in the larger end of the tumbler 26 to weight the same. The smaller end of each tumbler 26 is provided with a suitable aperture therethrough whereby the tumbler is rotatably mounted on a portion of one of the arms 25 for swinging movement relative thereto in a plane normal thereto.

Figure 4:
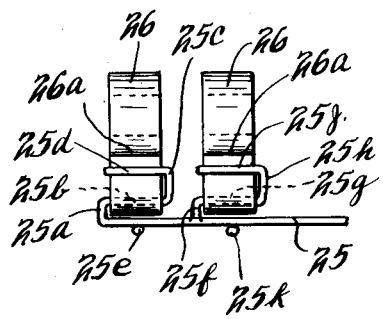
Figs. 4 and 5 are respectively front and side views of the tumblers of my device shown in enlarged scale.
Figure 5:
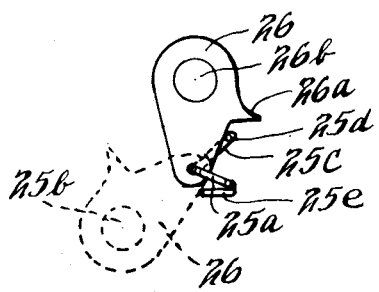

As shown in Fig. 4, the outer portion of the wire forming the one of the arms 25 which extends to the left as viewed in Fig. 1 is bent at right angles so as to form a portion 25a extending on an incline toward the panel P and somewhat upwardly and is again bent to extend toward the hub 24 parallel to the main part of the arm 25 to form a bearing pin 25b upon which one of the tumblers 26 is pivotally mounted. The wire is again bent at right angles to form a portion 25c extending at an incline away from the panel and slightly upwardly and is finally bent once more at right angles to form a stop 25d extending parallel to the main part of the arm 25 in a direction away from the hub 24. The tumbler 26 mounted on the bearing pin 25b is restrained against movement longitudinally of the bearing pin 25b by the portions 25a and 25c. The stop 25d is so located that the tumbler 26 may rest thereagainst in top heavy condition with its center of gravity above and slightly outward of the bearing pin 25b whereby a slight pressure exerted against the tumbler 26 to induce movement thereof in the direction of the panel P will cause the tumbler 26 to fall toward the panel P and downwardly. A stop 25e formed of wire and attached to the arm 25 extends inwardly from the arm 25 to arrest the falling of the tumbler 26 before the same reaches the depending position it would otherwise assume.

Immediately inwardly of the elements 25a, 25b, 25c, 25d and 25e another similar series of elements 25f, 25g, 25h, 25j and 25k are similarly mounted on the arm 25 to accommodate a second tumbler 26 as shown. The two tumblers 26 are located coaxially, are spaced apart only slightly and are so disposed that the lip elements 26a thereof face outwardly or toward the vane 15 for engagement with the tripping element 15a thereof.

The remaining arm 25 is also provided with a pair of tumblers 26 associated therewith in the manner described above.

A flat guide plate 27 is secured to the upper portion of the front of the clock T and is disposed adjacent and parallel to the path of the tumblers 26 as the same approach the vane 15 so as to force the tumblers into their upwardly swung top heavy position.

Figures 3, 6:
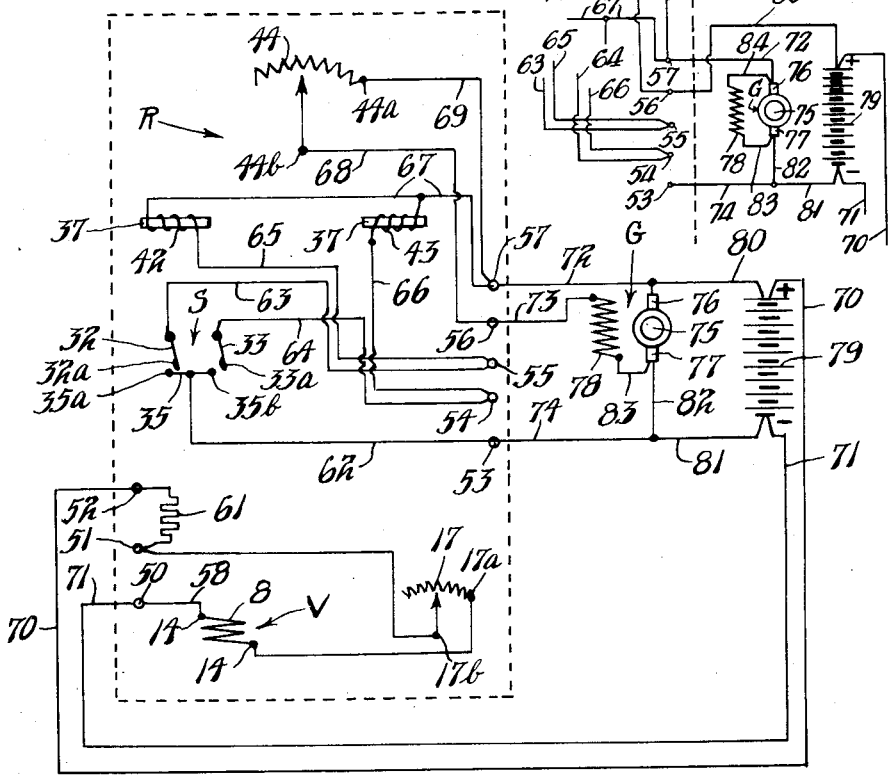
Fig. 3 is an electrical connection diagram of my device with a storage battery and battery charging generator connected thereto.
Fig. 6 is a partial electrical connection diagram of another form of the external circuit of my regulator.

An electrical contact-making or switch means S is located at the left of and is supported by the clock T so as to be directly behind the turned upper end 15a of the vane 15 and in position to be actuated by the tumblers 26 when the same fall. A generally rectangular plate 28 disposed parallel to and spaced forwardly of the panel P carries at the right side thereof an outwardly extending portion 28a which is secured to the clock T by screws 28b. A block 29 of insulating material extends horizontally across the upper portion of the plate 28 and a second block 30 of insulating material is disposed forwardly of the block 29. Nutted bolts 31 extend through suitable apertures in the blocks 30 and 29 and the plate 28 to secure the blocks to the plate. A pair of thin flat springs 32 and 33, respectively carrying electrical contacts 32a and 33a on their lower ends are clamped adjacent their upper ends between the blocks 29 and 30 so as to leave their upper ends projecting above the blocks 29 and 30 to serve as connection terminals. The plate 28 is provided with an aperture 34 into which the contact carrying lower ends of the springs 32 and 33 are bent. A small metal plate 35 secured to the rear of the insulating plate 28 just above the aperture 34 by means of a nutted bolt 36 is bent forwardly and upwardly to extend into the aperture 34 and to incline upwardly toward the front face of the insulating plate 28. The forwardly and downwardly facing portion of the metal plate 35 is formed into a pair of interconnected electrical contacts 35a and 35b, as shown by Fig. 3, positioned for engagement respectively by the contacts 32a and 32b carried by the springs 32 and 33. The springs 32 and 33 are so flexed that their lower ends normally bear against the portion of the insulating panel 28 defining the lower side of the aperture 34 whereby the contacts 32a and 33a carried by the springs are kept out of engagement with the contact portions 35a and 35b of the metal plate 35. The medial portions of the springs 32 and 33 are positioned directly behind the respective paths of rotation of the tumblers 26 whereby a tumbler 26 falling rearwardly as previously described will strike the medial portion of the corresponding one of the springs 32 and 33 and will momentarily drive the same rearwardly to cause momentary engagement of the contact 32a or 33a carried thereby with the corresponding one of the contact portions 35a and 35b of the metal plate 35.

Above the previously described portions of my device an electrically operated rheostat R is mounted on the panel P. This electrically operated rheostat consists in general of a rheostat and an electromagnetic rheostat operating mechanism which is arranged for operation to progress the rheostat in either one of its respective directions of movement. Each of two similar portions of the electromagnetic mechanism includes an E-shaped laminated iron core 37 the middle leg of which is adapted to carry a coil or winding. The laminations of each of the cores 37 are clamped together by nutted bolts 37a extending through suitable apertures in the laminations. The respective cores are mounted with the open sides thereof facing and spaced apart a substantial distance. The upper legs of the respective cores 37 are connected by plates 38 and 39 respectively located at the front and rear sides of the cores and clamped thereto by nutted bolts 40 which extend through suitable apertures in the plates 38 and 39 and the cores 37. The lower legs of the cores 37 are connected by an H-shaped element 41 formed of sheet material and so bent that the cross bar portion extends from front to rear of the cores 37 and the respective side portions rest against the front and rear sides of the lower legs of the cores 37. The H-shaped element 41 is clamped to the cores 37 by means of nutted bolts 41a extending through the cores 37 and the element 41.

The middle leg of the left hand core 37 as viewed in Fig. 1 carries a coil or winding 42 and the middle leg of the right hand core 37 carries a coil 43. A rheostat or variable resistance 44 having terminals 44a and 44b is mounted on the plate 38 with its operating shaft 44c extending rearwardly through and beyond the plate 38. A gear or duo-directional ratchet wheel 45 is mounted on the rear end portion of the rheostat operating shaft 44c.

The open side of each of the cores 37 has an armature 46 associated therewith and arranged to cooperate with all three legs of the core. The armatures 46 are swingably mounted on pivot pins 46a journaled in apertures in the plates 38 and 39 closely adjacent the free ends of the upper legs of the respective cores 37. A stop comprising a small rectangular plate 41b secured to the upper side of the cross bar portion of the H-shaped member 41 by means of a nutted bolt 41c is provided to limit the distance to which the armatures 46 may move away from the respective cores 37.

Each of the armatures 46 includes an integral portion comprising an arm 46b extending upwardly beyond the pivot pin 46a and adapted to carry a dog or pawl on its upper end for cooperation with the ratchet 45. The upper end of each of the pawl carrying arms 46b is provided with a slot extending from the outer end thereof a short distance downwardly along the longitudinal center line of the arm and carries a pivot pin 46c extending across the slot and upon which a pawl 47 is swingably mounted between the portions of the arm 46b defining the slot therein.

Each pawl 47 is constructed of heavy sheet metal lying in a vertical plane except at its forward end where the metal is twisted to 90 degrees and is bent downwardly to provide a suitable horizontal edge 47a for engagement with the teeth of the ratchet 45. A short distance forwardly of the rear end of the pawl 47 and adjacent the upper edge thereof an aperture is provided by means of which the pawl is swingably mounted on the pivot pin 46c carried by the arm 46b. The pawl 47 is provided with a slot extending downwardly from a point a short distance below the above mentioned aperture to the lower edge of the pawl. The portions of the pawl defining this slot are disposed at opposite sides of the unslotted portion of the arm 46b and are far enough apart to permit limited rocking movement of the pawl 47 relative to the arm 46b. The pawl 47 has an apertured ear 47b projecting rearwardly from the lower rear portion thereof. A tension spring 48 is connected at one of its ends to the apertured ear 47b and at its other end to a spring anchoring yoke 49 which is attached to the core 37 by portions thereof clamped under the head and nut of the upper one of the laminations clamping bolts 37a. The spring 48, as will be seen from the drawings, is arranged to urge the armature 46 away from the core 37 and to urge the forward end of the pawl 47 toward the ratchet 45. The slot in the pawl 47 is proportioned to so limit the rocking movement of the pawl relative to the arm 46b that the pawl will normally remain out of engagement with the ratchet 45 and will engage the ratchet only during the latter part of the travel of the armature 46 toward the core 37 with the result that the ratchet will be progressed to the extent of only one tooth for each operation of the armature 46.

While the above description refers to a single pawl 47 it is apparent that both of the pawls 47 and the parts connected thereto are similarly constructed and that the respective pawls face in opposite directions so as to progress the ratchet 45 in opposite directions. The left hand pawl is arranged to progress the movable parts of the rheostat 44 in a counter-clockwise direction to reduce the resistance.

Three electrical connection terminals 50, 51 and 52 are mounted in the left hand portion of the panel P for the circuit to the voltage responsive element V and five terminals 53, 54, 55, 56 and 57 are mounted in the right hand portion of the panel P for the circuits to the electromagnetic operating mechanisms and the rheostat 44 of the electrically operated rheostat R.

One of the terminals 14 of the voltage responsive element V is connected to the terminal 50 by means of a wire 58 and the remaining terminal 14 of the voltage responsive element is connected to the terminal 17a of the rheostat 17 by means of a wire 59. Terminal 17b of the rheostat 17 is connected to terminal 51 through a wire 60. A resistor 61, appearing in Fig. 3, of conventional type concealed behind the panel P is connected at its respective ends to terminals 51 and 52.

The contact plate 35 of the contact making device S is connected through a wire 62 to terminal 53 and the contact springs 32 and 33 are respectively connected to terminals 55 and 54 through wires 63 and 64. Terminal 55 is connected to one terminal of the coil 42 through a wire 65 and terminal 54 is connected to one terminal of the coil 43 through a wire 66. The remaining terminals of the respective coils 42 and 43 are connected together and to terminal 57 by means of a wire 67. One terminal 44b of the rheostat 44 is connected to terminal 56 by means of a wire 68 and the other terminal 44a of rheostat 44 is connected to terminal 57 through a wire 69.

For purposes of connection of my battery charging voltage regulator to apparatus external thereto suitable apertures are provided in the casing C to accommodate extension therethrough of wires from the rear ends of the terminals 50, 52, 53, 56 and 57 to points located externally of the case C. Such wires include wire 70 connected to terminal 52, wire 71 connected to terminal 50, wire 72 connected to terminal 57, wire 73 connected to terminal 56 and wire 74 connected to terminal 53.

While my regulator is readily suitable for use with various types of battery charging apparatus, it is shown in the connection diagram of Fig. 3 as used in connection with a shunt connected direct current generator G having an armature 75, brushes 76 and 77 and a shunt field winding 78. For the purpose of expediting explanation the brushes 76 and 77 are hereinafter assumed to be respectively the positive and negative brushes.

The positive terminal of a storage battery 79 being charged by the generator G is connected to the positive brush 76 of the generator G through a wire 80 and the negative terminal is connected to the negative brush 77 through wires 81 and 82. The negative end of the field winding 78 is connected to the negative brush 77 through a wire 83. The wires 70 and 71 previously described are respectively connected to the positive and negative terminals of the battery to complete a circuit between the battery 79 and the voltage responsive element V of my regulator.

The wires 72 and 73, previously described, are respectively connected to the positive brush 76 and the positive end of the field winding 78 to complete a circuit between the armature 75 and the field winding 78, through the rheostat 44 whereby the current through the field coil 78 and consequently the terminal voltages of the generator G and the battery 79 may be controlled by rheostat 44.

Wire 74, previously described, is connected to wire 82 and therethrough to the negative brush 77 whereby circuits from the armature 75 to either of the coils 42 and 43 may be respectively completed by closure of the contacts 32a and 35a or the contacts 33a and 35b.

Operation

In use of my voltage regulating device with a storage battery 79 and a battery charging generator G the device is connected as shown in Fig. 3.

As shown, the coil 8 of the voltage responsive element V is connected to the battery 79 through the resistor 61 and the rheostat 17 which jointly serve as a multiplier resistance. The voltage responsive element is so arranged that an increase in voltage will cause the vane 15 to deflect to the left. When my regulator is placed in operation, the rheostat 17 is so adjusted that the voltage at which it is desired to charge the battery 79 will bring the vane 15 to a central position wherein it will be disposed midway between the respective side portions of the stop member 15a and wherein the respective tumblers 26 on each of the arms 25 will pass on opposite sides of the tripping element 15a of the vane 15 as the tumbler carrying arms 25 rotate past the tripping element 15a. Obviously, as long as the desired voltage is maintained, none of the tumblers 26 will engage the tripping element 15a and no action of the regulator will take place other than slow constant rotation of the arms 25.

If the charging voltage rises above the desired voltage the vane 15 will be deflected to the left of its normal centered position and the tripping element 15a thereof will be disposed in the path described by the lip element 26a of the outermost ones of the tumblers 26 of the respective arms 25. The next time one of the slowly rotating arms 25 moves past the tripping element 15a the lip 26a of the outermost one of the tumblers 26 thereon will engage the tripping element 15a. During further rotation of the arm 25 the lip 26a is restrained by the trip element 15a from rotation with the rotating arm 25 and hence the tumbler 26 is tipped rearwardly relative to the arm 25 until overbalanced whereupon the tumbler 26 will fall rearwardly and then downwardly until it strikes the stop 25e.

As the tumbler 26 falls rearwardly and downwardly it strikes the contact carrying spring 32 and swings the same inwardly to momentarily bring the contact 32a carried thereby into engagement with the contact 35a of the plate 35. As the tumbler 26 leaves engagement with the spring 32 the same springs back to its normal position.

The contacts 32a and 35a, while momentarily engaged as described above, momentarily complete a circuit from the generator G to the coil 42 of the electrically operated rheostat R. During the short period of time when the coil 42 is energized the left hand core 37, upon which the coil is mounted, is magnetized and draws the armature 46 associated therewith toward itself. Movement of the armature 46 toward the core 37 brings the left hand pawl 47 into engagement with a tooth of the ratchet 45 and projects the pawl toward the right to rotate the ratchet 45 and the operating shaft 44c of the rheostat 44 through a slight angle in a clockwise direction. The rotation of the rheostat shaft 44c in a clockwise direction increases the resistance provided by the rheostat and hence decreases the current in the field 78 of the generator G. Reduction in field current in the generator G reduces the charging current delivered to the battery 79 by the generator G and following this change the battery terminal voltage will decrease. If the battery voltage has decreased to the desired voltage by the time the remaining one of the arms 25 passes the tripping element 15a neither of the tumblers 26 will be engaged by the tripping element 15a and no regulatory action will occur. If the battery voltage has not decreased to the desired voltage another regulatory action similar to the action previously described will take place.

If at any time the battery voltage drops below the desired voltage the vane 15 and the trip element 15a thereon will be deflected to the right of their normal centered position and, when an arm 25 is passing the trip element 15a, the innermost one of the tumblers 26 on the arm 25 will be overturned in the manner previously described in connection with the outermost one of the tumblers 26. The tumbler 26, in dropping, will momentarily close the contacts 33a and 35b to momentarily energize the coil 43 and hence operate the armature 46 and pawl 47 to rotate the ratchet 45 and rheostat operating shaft 44c through a slight angle in a counter-clockwise direction. This movement of the rheostat shaft 44c results in reduction of the resistance in the rheostat 44 and hence increases the charging current delivered by the generator G to the battery 79. Following the increase in charging current the battery terminal voltage will gradually increase toward the desired voltage. If the voltage has not reached the desired voltage when an arm 25 again passes the trip element 15a another operation similar to the above described operation will take place at that time.

After a tumbler has been upset by the tripping element 15a it is automatically returned to its normal top heavy position before it again passes the tripping element. When the arm 25 on which one of the tumblers 26 has been upset has traveled half a revolution from the position wherein it passes the tripping element 15a gravity will have returned the upset tumbler 26 almost to its normal position relative to the arm 25. As this tumbler 26 passes the guide plate 27 it is engaged thereby and forced into its normal top heavy position wherein it rests against the stop 25d.

It is to be particularly noted that the arms 25 rotate only very slowly so that voltage correcting operations of my regulator can only occur at predetermined intervals of time. It is also to be noted that each voltage correcting operation will progress the rheostat 44 through a limited predetermined angle of rotation regardless of the degree of variance of the battery voltage from the desired voltage. This method of operation is particularly well adapted for control of the voltage of a battery charged by the "floating charge" method for the reason that a change in charging current is not immediately accompanied by a corresponding change of battery voltage and hence the steady voltage subsequently to be assumed by a battery following a change in adjustment of the charging apparatus cannot be determined at the time of the change of adjustment. The interval of time between voltage corrective operations enables the battery to have reached a steady voltage corresponding to the charging current before another operation can be initiated. In this manner over adjustment and frequently repeated operations alternately increasing and reducing the voltage are eliminated.

Fig. 6 illustrates the use of my regulator in connection with a battery charging generator in a manner slightly different from that described above. The connection scheme for this form of the invention is identical with the diagram of Fig. 3 except that in the connections external to the regulator proper the field coil 78 of the generator G is connected directly across the brushes 76 and 77 of the generator without the rheostat R in series therewith and the charging circuit from the generator G to the battery 79 is rearranged to place the rheostat R in series therewith as shown in Fig. 6. The upper end of the field coil 78 instead of being connected through the wire 73 to the terminal 56 is connected through a wire 84 to the positive generator brush 76. The positive terminal of the battery 79, instead of being directly connected to the positive brush 76 of the generator G through the wire 80, is connected through a wire 85 to the terminal 56 whereby the rheostat R is connected in series with the charging circuit from the generator G to the battery 79. It will be seen that the regulation of battery voltage in this case is afforded by direct regulation of battery charging current rather than by regulation of generator voltage.

While my device has been illustrated and described as used in connection with a battery having a direct current generator as a charging means therefor, it is apparent that the rheostat 44 may be connected in the circuits of other types of battery charging equipment such as various forms of rectifiers and battery charging circuits served by direct current power and light lines. In the case of rectifiers, while the rheostat may be connected in the direct current charging circuit to the battery, I have found it preferable to connect the rheostat 44 in the alternating current input circuit of the rectifier.

It is apparent that my automatic regulator may be readily used for regulation of voltage in circuits other than the circuits of storage batteries and associated charging apparatus and that a current responsive element or an element responsive to other conditions may be substituted for the voltage responsive element of my regulator to adapt the device for regulation of conditions other than voltage without departure from the inventive idea of the device.

It is apparent that I have invented a novel, accurate and efficient automatic battery charging voltage regulator wherein no frictional load is imposed on and no electrical contacts are carried by the voltage responsive element and whereby regulatory adjustments of charging current leading toward re-establishment of a predetermined battery terminal voltage are made at predetermined intervals of time.

It will, of course, be understood that various changes may be made in the form, details, arrangement, and proportions of the parts, without departing from the scope of my invention, which, generally stated, consists in a device capable of carrying out the objects above set forth and in the novel parts and combinations of parts disclosed and defined in the appended claims.

What is claimed is:—

1. In combination with a storage battery and a battery charging device operatively connected thereto, battery voltage regulating apparatus comprising variable means in the circuit of said charging device for varying the voltage applied to said battery by said charging device, voltage responsive apparatus connected to said battery and having a member shiftable in response to variation in said voltage, continuously movable means carrying an actuating element in an endless path passing closely adjacent said shiftable member, said actuating element either remaining inoperative or being rendered operative by said shiftable member as it passes the same dependent upon the position of said shiftable member, mechanism for operating said variable means, said mechanism being brought into operation by said actuating element when the same has been rendered operative.

2. In combination with a storage battery and a charging circuit therefor, automatic battery voltage regulating apparatus comprising voltage regulating means in said charging circuit, a voltage responsive element connected to said battery and including a member varying in position in response to variation in said voltage, means continuously moving through an endless path, an actuating element carried by said means and passing adjacent said member at one point in the path of said actuating element whereby said actuating element will engage said member and be shifted thereby relative to said continuously moving means if said member is in one of certain of its possible positions when said actuating element passes the same, and operating mechanism for said voltage regulating means so controlled by said actuating element that said regulating means will be adjusted when said actuating element has been shifted relative to said continuously moving means.

3. In combination with a storage battery and a charging circuit therefor, automatic battery voltage regulating apparatus comprising voltage regulating means in said charging circuit, operating mechanism for said regulating means, voltage responsive means connected to said battery and including an element varying in position in response to variation in said voltage, a pair of actuating elements, means for continuously moving said actuating elements through respective endless paths passing respectively through points adjacent said varying element, said actuating elements each being shiftable relative to said means whereby if said varying element is in a position other than a certain position thereof as said actuating elements pass thereby one or the other of said actuating elements will engage said varying element and be shifted thereby relative to said means and said operating mechanism being controlled by said actuating elements in such manner that shifting of one of said actuating elements will cause said mechanism to operate said regulating means to raise said voltage and shifting of the other of said actuating elements will cause said mechanism to operate said regulating means to lower said voltage.

4. In combination with a storage battery and a battery charging device operatively connected thereto, battery voltage regulating apparatus including a rotatable member, means for rotating said member, a tumbler pivotally and eccentrically mounted on said member for swinging movement relative thereto, means for releasably holding said tumbler in a position wherein its center of gravity is above its pivot axis when said tumbler is carried by said member through a certain part of its path, a voltage responsive element connected to said battery and having a member shiftable in response to voltage into and out of a position adjacent said certain part of the path of said tumbler, said member being arranged to be engaged by and to upset said tumbler when in said position at the time of passage of said tumbler, voltage varying means in a circuit of said charging device and an operating mechanism for said voltage varying means having a control element positioned and arranged to be actuated by said tumbler when said tumbler has been upset.

5. In combination with a storage battery and a battery charging device operatively connected thereto, battery voltage regulating apparatus comprising a rotatable member, means for continuously rotating said member, a pair of tumblers pivotally mounted on said member for swinging movement relative thereto, the center of gravity of each tumbler being eccentrically located relative to the pivot axis thereof, means for releasably holding each of said tumblers in a position wherein its center of gravity is above its pivot axis when the same is passing through a certain part of its path, a voltage responsive element connected to said battery and including a member shiftable in response to variation in battery voltage between positions adjacent the respective paths of said tumblers and through a position intermediate said first mentioned positions, said member being arranged to engage and upset one or the other of said tumblers when in any position other than said intermediate position and to engage neither of said tumblers when in said intermediate position, voltage varying means in a circuit of said charger, an operating mechanism for said voltage varying means, a pair of control elements for controlling said mechanism located and arranged to be actuated by the respective ones of said tumblers whereby one tumbler, when upset, will actuate one of said control elements to bring about a reduction in voltage and the other tumbler, when upset, will actuate the other of said control elements to bring about an increase in voltage.

6. In an electric voltage regulating device for use in conjunction with a storage battery and a battery charging device connected to said battery, a voltage responsive element adapted to be connected to the terminals of said battery and having a vane arranged to assume various positions corresponding to various voltages applied to said element, a rotatable member adjacent said vane, a pair of eccentric tumblers swingably mounted on said member to pass closely adjacent said vane as said member rotates, said tumblers being arranged to pass on respective sides of said vane in closely spaced relation thereto when said vane is in a certain position intermediate the limits of movement thereof, means arranged to releasably hold said tumblers in a position where the centers of gravity thereof are above the respective centers of rotation thereof whereby when said vane is in a position other than said intermediate position one of said tumblers will be engaged thereby in passing and will be upset to fall into a depending position, two pairs of electrical contacts each pair of which is positioned and arranged to be momentarily engaged and closed by one of said tumblers as said tumbler falls to its depending position, a pair of electromagnetic operating mechanisms respectively energized through said contacts, and a variable resistor so operated by said mechanisms that one of said mechanisms will operate said variable resistor to increase the resistance thereof and the other of said mechanisms will act to decrease said resistance, said resistor being adapted to be connected at a suitable point in a circuit of said battery charging device to control the charging voltage applied to said battery by said charging device.

7. In an electrical voltage regulating device for use in conjunction with a storage battery and a battery charging device connected to said battery, a voltage responsive element adapted to be connected to the terminals of said battery and having a vane arranged to vary in position responsive to variation in battery voltage, a rotatable member adjacent said vane, means for rotating said member, a pair of eccentric tumblers swingably mounted on said member to pass closely adjacent said vane as said member rotates, said tumblers being arranged to pass on respective sides of said vane in closely spaced relation thereto when said vane is in a certain position intermediate the limits of movement thereof, means arranged to releasably maintain said tumblers in a position whereby the centers of gravity thereof are above the respective centers of rotation thereof when passing said vane and whereby when said vane is in a position other than said intermediate position, one of said tumblers will be engaged thereby in passing and will be upset to fall into a depending position, two pairs of electrical contacts each pair of which is positioned and arranged to be momentarily engaged and closed by one of said tumblers as said tumbler falls to its depending position, a pair of electromagnetic operating mechanisms respectively energized through said contacts, and a variable resistor so operated by said mechanisms that one of said mechanisms will operate said variable resistor to increase the resistance thereof and the other of said mechanisms will act to decrease said resistance, said mechanisms being so arranged that each operation thereof will adjust said resistance to only a definite predetermined extent, said resistor being adapted to be connected in a circuit of said battery charging device at a suitable point to control the charging voltage applied to said battery by said charging device.

LOUIS H. GUDE.